United States Patent [19]
Derrien et al.

[11] Patent Number: 5,310,139
[45] Date of Patent: May 10, 1994

[54] SHOCK ABSORBER FOR AIRCRAFT LANDING GEAR

[75] Inventors: Michel Derrien, Versailles; Bernard Guyot, Seine Port, both of France

[73] Assignee: Messier-Bugatti, Velizy-Villacoublay, France

[21] Appl. No.: 720

[22] Filed: Jan. 5, 1993

[30] Foreign Application Priority Data

Jan. 7, 1992 [FR] France .................. 92 00073

[51] Int. Cl.⁵ .................................... B64C 25/10
[52] U.S. Cl. ................... 244/104 FP; 267/64.16
[58] Field of Search ......... 244/104 R, 104 FP, 100 R, 244/102 R, 102 FP; 267/64.16, 64.17

[56] References Cited

U.S. PATENT DOCUMENTS

| | | |
|---|---|---|
| 2,735,634 | 2/1956 | Fosness . |
| 2,933,271 | 4/1960 | Maltby . |
| 3,826,450 | 7/1974 | Currey . |
| 4,445,672 | 5/1984 | Turiot .................. 267/64.16 |
| 4,907,760 | 3/1990 | Sealey et al. ............ 244/102 SS |
| 5,219,152 | 6/1993 | Derrian et al. ........... 267/64.16 |

FOREIGN PATENT DOCUMENTS

156796  12/1953  Sweden .................. 244/102 SS

*Primary Examiner*—Galen L. Barefoot
*Attorney, Agent, or Firm*—Sixbey, Friedman, Leedom & Ferguson

[57] ABSTRACT

The invention relates to a shock absorber of the type comprising a cylinder and a sliding rod, together with a moving disk that defines a bottom hydraulic chamber that communicates via a diaphragm with a top hydraulic fluid chamber that is adjacent to a pressurized gas chamber formed in the top of the cylinder. According to the invention, a self-contained linear actuator is disposed coaxially inside the sliding rod, being interposed between the moving disk and a lower abutment secured to said sliding rod, independent control means being also provided to control the linear actuator, such that when said means are engaged they enable the landing gear to be extended when the aircraft is stationary on the ground.

10 Claims, 5 Drawing Sheets

FIG_1

FIG_2

FIG_3

FIG_4

ABSORBER FOR AIRCRAFT LANDING GEAR

The invention relates to shock absorbers for aircraft landing gear, and in particular for retractable airplane landing gear.

BACKGROUND OF THE INVENTION

A known type of shock absorber for retractable landing gear of an airplane comprises a cylinder and a rod that slides in said cylinder, said rod having a fixed end delimiting a bottom chamber of hydraulic fluid that communicates via a diaphragm with a top chamber of hydraulic fluid adjacent to a chamber containing gas under pressure and formed in the top of the cylinder.

In some situations, when the airplane is at rest on the ground, it is desirable to be able to modify the attitude of the airplane, i.e. the inclination of its longitudinal axis.

One possible approach then consists in attempting to change the length of the front landing gear without altering the main landing gear. If the front landing gear can be lengthened, then the desired attitude of the airplane can be obtained while it is stationary on the ground.

Under such circumstances, it is advantageous to provide front landing gear that is adapted to be extensible.

Nevertheless, it is important to avoid confusing the system used for extending the landing gear when the airplane is stationary on the ground, with the means for extending the landing gear so as to enable it to run over irregular ground and even overcome obstacles of considerable size. In the latter case, it is desirable to change the "isothermal" response curve of the shock absorber (variations in shock absorber force as a function of compression stroke), e.g. by providing a structure enabling the shock absorber to have a single chamber on landing but two chambers while running on the ground (after it has been extended), as described in document FR-A-2 601 097.

The shock absorber described in that document thus comprises a moving disk defining the top of a high pressure gas chamber whose bottom is defined by a piston whose rod passes through the moving disk, and a bottom hydraulic fluid chamber which is defined by said piston and the end of the sliding rod, and which is fed from a controllable source connected to the hydraulic supply of the airplane. The structure of that shock absorber is a result of the desired objective, namely passing over bumps while running on the ground, and such a shock absorber is not suitable merely for static extension of the landing gear when the airplane is stationary on the ground.

The static approach to extension for an airplane that is stationary on the ground consists in generating a force equivalent to the static load on the landing gear so as to raise the cylinder of the shock absorber relative to its sliding rod (which rod is in fact stationary, such that extending the shock absorber by causing its sliding rod to move out from the cylinder is, in fact, raising the cylinder of said shock absorber).

An object of the invention is to solve this technical problem by designing a shock absorber whose structure makes it easy to raise the landing gear when the airplane is stationary on the ground, without requiring the airplane's hydraulic generator to be used, i.e. without requiring its engines to be in operation.

Another object of the invention is to provide a shock absorber that is simple in design, for which it is easy to control extension without any risk of disturbances in or leaks from the hydraulic generator circuits of the airplane.

SUMMARY OF THE INVENTION

More particularly, the present invention provides a shock absorber for aircraft landing gear, the shock absorber comprising a cylinder and a rod sliding inside said cylinder, together with a moving disk delimiting a bottom hydraulic fluid chamber which communicates via a diaphragm with a top hydraulic fluid chamber adjacent to a pressurized gas chamber formed in the top of the cylinder, wherein a self-contained linear actuator is disposed coaxially inside the sliding rod, being interposed between the moving disk and a bottom abutment secured to said sliding rod, independent control means also being provided to control said linear actuator, which when engaged serves to extend the landing gear while the aircraft is stationary on the ground.

The independent control of this self-contained linear actuator thus makes it possible to extend the landing gear without it being absolutely necessary to use the airplane's hydraulic power generator.

Advantageously, the linear actuator comprises a main body bearing against the bottom abutment, and a moving member whose end is in direct contact with the moving disk.

If it is important, above all, for the shock absorber to be compact, it is advantageous for the the bottom portion of the main body to receive the control means of the linear actuator, such that said control means are integrated inside the sliding rod.

In a variant, the control means are disposed, at least in part, outside the sliding rod so as to make it easier for ground crew to take action on said means, should that be necessary.

In a particular embodiment, the linear actuator is a hydraulic actuator whose rod makes contact directly with the moving disk.

In which case, it is advantageous for the hydraulic actuator to include a piston rod that is slidable in an upper chamber of the main body of the actuator, said main body further having a lower chamber in which a pressurized supply of hydraulic fluid and an electrical pump are provided, the outlet of the pump communicating with the inside of the piston rod.

It is then advantageous for the main body of the hydraulic actuator to include a central block delimiting the two chambers of said body, said central block receiving electro-hydraulic members associated with controlling the electrical pump. In particular, the electro-hydraulic control members include an electrically controlled valve which is excited to extend the landing gear, and de-excited to shorten said landing gear.

In another embodiment, the linear actuator is an electro-mechanical screw-and-nut actuator whose screw is prevented from moving axially and whose nut is secured to a hollow rod which makes contact directly with the moving disk.

It is then advantageous for the hollow rod to slide in an upper chamber of the main body of the electromechanical actuator, said main body further having a lower chamber in which at least a portion of a driving motor and gear box assembly is received.

The driving motor and gear box assembly may be completely integrated in the sliding rod if maximum compactness is required. In a variant, the motor of this assembly (and optionally the gear box associated therewith) may be mounted outside the sliding rod so as to facilitate possible intervention on the ground on said motor without it being necessary to bring the airplane over an inspection pit or to raise the nose of the airplane.

BRIEF DESCRIPTION OF THE DRAWINGS

Embodiments of the invention are described by way of example with reference to the accompanying drawings, in which.

DETAILED DESCRIPTION

Figure 1:
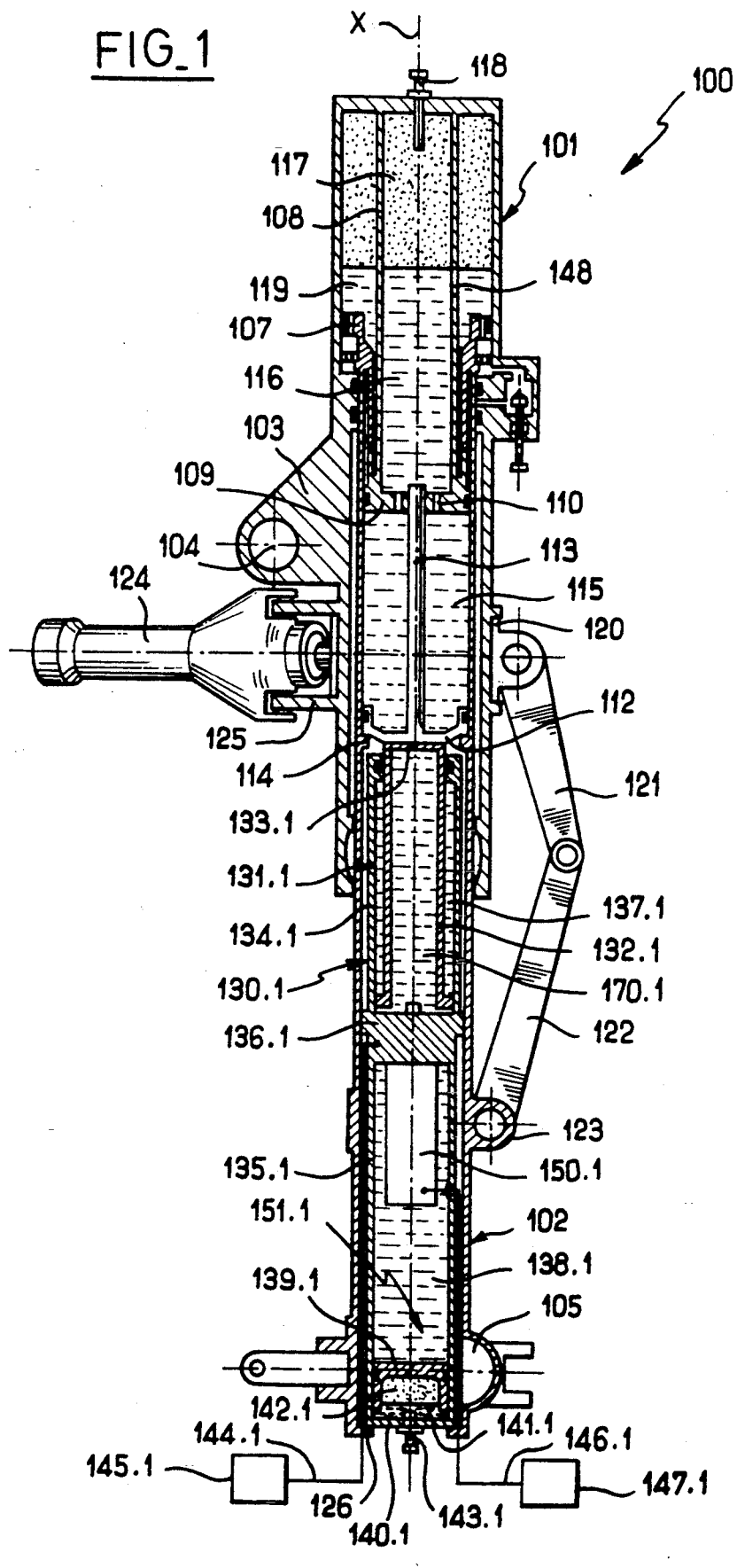
FIG. 1 is an axial section through a shock absorber of the invention, in which the electrically-driven pump is integrated in the main body of said actuator, and in which the position shown corresponds to the shock absorber being relaxed (no static load) and non-extended.

FIG. 1 shows a shock absorber 100 for aircraft landing gear in accordance with the invention, comprising a cylinder 101 and a rod 102 sliding in said cylinder, coaxially about the axis X thereof. The shock absorber 100 firstly comprises various members of conventional type whose structure is outlined briefly below.

The cylinder 101 has a hinge axis (not shown) with the structure of the airplane, and an appendix 103 corresponding to a hinge axis 104 associated with the side brace of the shock absorber, since this shock absorber is for retractable landing gear. Gusset plates 125 are used to provide hinges with two actuators 124 that control the steering direction of the landing gear wheels, with the rods of these actuators being connected to a rotary sleeve 120 coaxial with the cylinder 101. A scissors linkage provides connection between the rotary sleeve 120 and the sliding rod 102, said scissors linkage comprising a top arm 121 and a bottom arm 122, which bottom arm is hinged to an appendix 123 secured to the sliding rod 102. The bottom of the sliding rod 102 carries a wheel set, and in the figures only a passage 105 associated with the corresponding axle can be seen.

The sliding rod 102 extends upwards to a top enlargement 107 which moves in the top portion of the cylinder 101. The cylinder 101 also includes a plunging rod 108 whose end referenced 109 slides inside the sliding rod 102. A moving disk 112 co-operates with the fixed end 109 of the plunger rod 108 to define a bottom chamber 115 of hydraulic fluid, said end 109 having a rod 113 passing through its center, which rod is secured to the moving disk 112 and said end 109 has throttling orifices 110 on either side of the rod 113 to perform the diaphragm function in conventional manner for hydraulic shock absorbing. The bottom hydraulic fluid chamber 115 thus communicates via the diaphragm with a top hydraulic fluid chamber 116 adjacent to a chamber containing air under pressure 117, which chamber is inflated via a valve 118. The chambers 116 and 117 thus occupy the inside of the plunger rod 108, at the top of the shock absorber cylinder 101, and a certain volume of hydraulic fluid 119 occupies the annular chamber surrounding said plunger rod 108, because of communication orifices 148.

The moving disk 112 rests on an abutment 114 secured to the sliding rod 102 with said disk bearing against said abutment when the shock absorber is relaxed, i.e. in the position shown in FIG. 1. It is nevertheless free to move axially upwards, over a predetermined stroke.

In accordance with an essential aspect of the invention, a self-contained linear actuator 130.1 is disposed coaxially inside the sliding rod 102, being interposed between the moving disk 112 and a bottom abutment 126 secured to said sliding rod, independent control means 150.1 being also provided to control said linear actuator, which, when engaged, serves to extend the landing gear when the aircraft is stationary on the ground.

In this case, the bottom abutment 126 is disposed at the bottom end of the sliding rod 102 so as to leave the maximum possible space for receiving the linear actuator 130.1.

The self-contained character of the linear actuator 130.1 and the independent character of the associated control means 150.1 make it possible to extend and subsequently to shorten the landing gear quite independently of the airplane's hydraulic generator, such that extension and shortening of the landing gear can be obtained without it being necessary to use the airplane's generator. The above-specified characteristics of independence and of being self-contained also make it possible to avoid any risk of disturbance to and/or leaks from the circuits associated with the airplane's hydraulic generator.

The embodiment shown in FIG. 1 comprises a linear actuator 130.1 implemented in the form of an electrohydraulic actuator constituted in this case by a hydraulic actuator comprising a main body 131.1, and a moving rod 132.1 whose free end 133.1 is in direct contact with the moving disk 112. In this case, the main body 131.1 bears against the bottom abutment 126 and the moving member of the actuator, namely the rod 132.1 bears directly against the moving disk 112. Naturally, in a variant, it would be possible to organize the hydraulic actuator the other way up so that its rod bears against the bottom abutment of the sliding rod 102 and so that its main body has an end in abutment against the moving disk 112. Nevertheless, the embodiment shown has several advantages in that the controls associated with the operation of the linear actuator can be grouped together at the bottom of the sliding rod 102. The hydraulic actuator 130.1 includes a piston rod 132.1 which is hollow in this case (hollowness is naturally not essential), and which is slidably mounted in a top chamber 137.1 of the main body 131.1 of the actuator. Said top chamber 137.1 is inside a top portion 134.1 of the main body of the actuator, and it is connected at the bottom to a central intermediate block 136.1. The main body 131.1 of the actuator further includes a bottom portion 135.1 extending from the central block 136.1 to the end 140.1 of the said main body. The bottom portion 135.1 thus delimits a bottom chamber 138.1 in which there are provided both a pressurized supply 151.1 of hydraulic fluid and an electrically driven pump 150.1 whose outlet communicates with the inside 170.1 of the piston rod 130.1. The pressurized supply of hydraulic fluid 151.1 is of conventional type and comprises a piston 139.1 defining the bottom of the bottom chamber 138.1 which is filled with hydraulic fluid, there being a chamber filled with gas under pressure 142.1 beneath the piston, which chamber is directly adjacent to a volume 141.1 of hydraulic fluid, thereby providing a pressurized supply while avoiding any danger of cavitation in the hydraulic pump 150.1. The pressurized supply can easily be filled from the end of the main body of the actuator via a valve 143.1 of conventional type. FIG. 1 also shows electrical lines providing associated connections to the control means: there can thus be seen a line 144.1 associated with the central block 145.1 which receives the electrohydraulic members for controlling the electrical pump 150.1, and a line 146.1 associated with the control of said electrical pump 150.1. The lines 144.1 and 146.1 are connected via conventional blocks 145.1 and 147.1 to the electricity supply of the airplane or to an independent supply.

There follows a description of the electrohydraulic members associated with controlling the electrical pump 150.1, which members are essentially received in the central block 136.1 of the main body 131.1. These electro-hydraulic members are shown diagrammatically in FIG. 4 for the sole purpose of ensuring that the description is complete, it being understood that such members are conventional in type.

Figure 4:
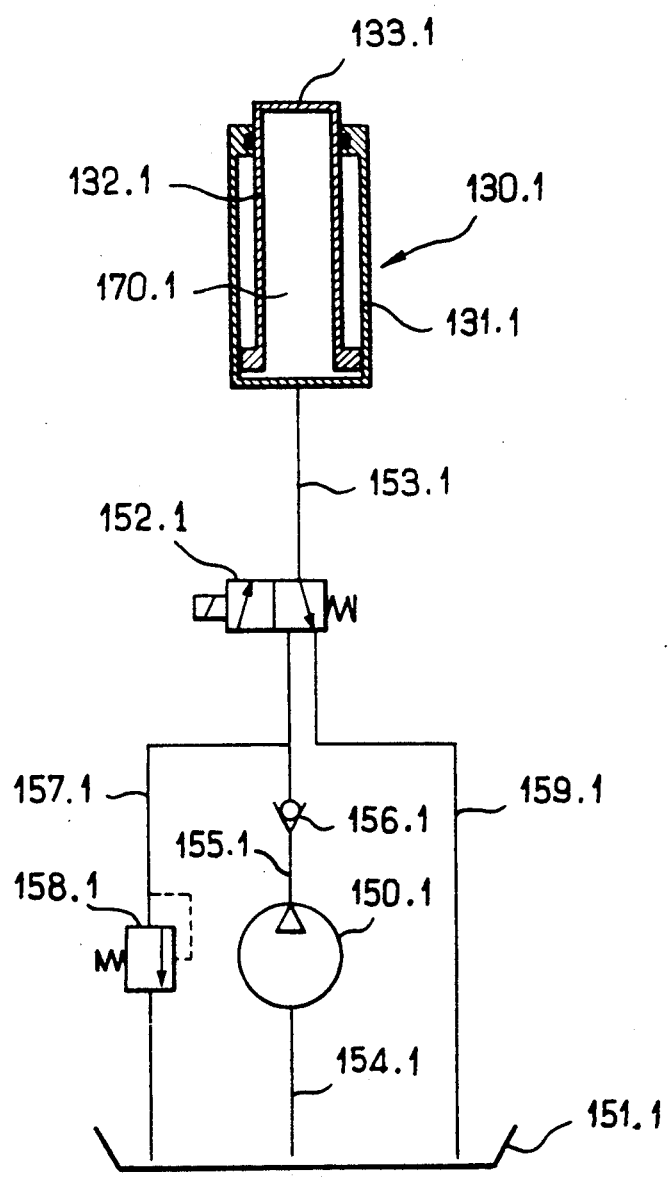
FIG. 4 is a diagram showing the electrical and hydraulic members associated with controlling the extending actuator of the above shock absorber, said members being located, in this case, in a central block of the main body of said actuator.

Thus, FIG. 4 is a diagram showing the hydraulic actuator 130.1, together with its main body 131.1 and its sliding piston rod 132.1 whose end is referenced 133.1. The connection between the electrical pump 150.1 and the inside 170.1 of the rod 132.1 is provided via a first line 155.1 including a non-return valve 156.1 and reaching an electrically controlled valve 152.1, downstream from which there is a second line 153.1. The electrical pump 150.1 is connected to the pressurized supply of hydraulic fluid 151.1 via a line 154.1. Hydraulic return is provided by a line 159.1 leading to the pressurized supply 151.1. The independent generator is completed by a line 157.1 fitted with an excess pressure relief valve 158.1. In the rest position, the electrically controlled valve 152.1 provides a return path to the pressurized supply 151.1, as represented by the position shown in FIG. 4. When the valve 152.1 is excited and the electrical pump 150.1 is activated, the pump delivers into the moving rod of the actuator, with the valve 158.1 preventing any risk of excess pressure in said feed.

Figure 2:
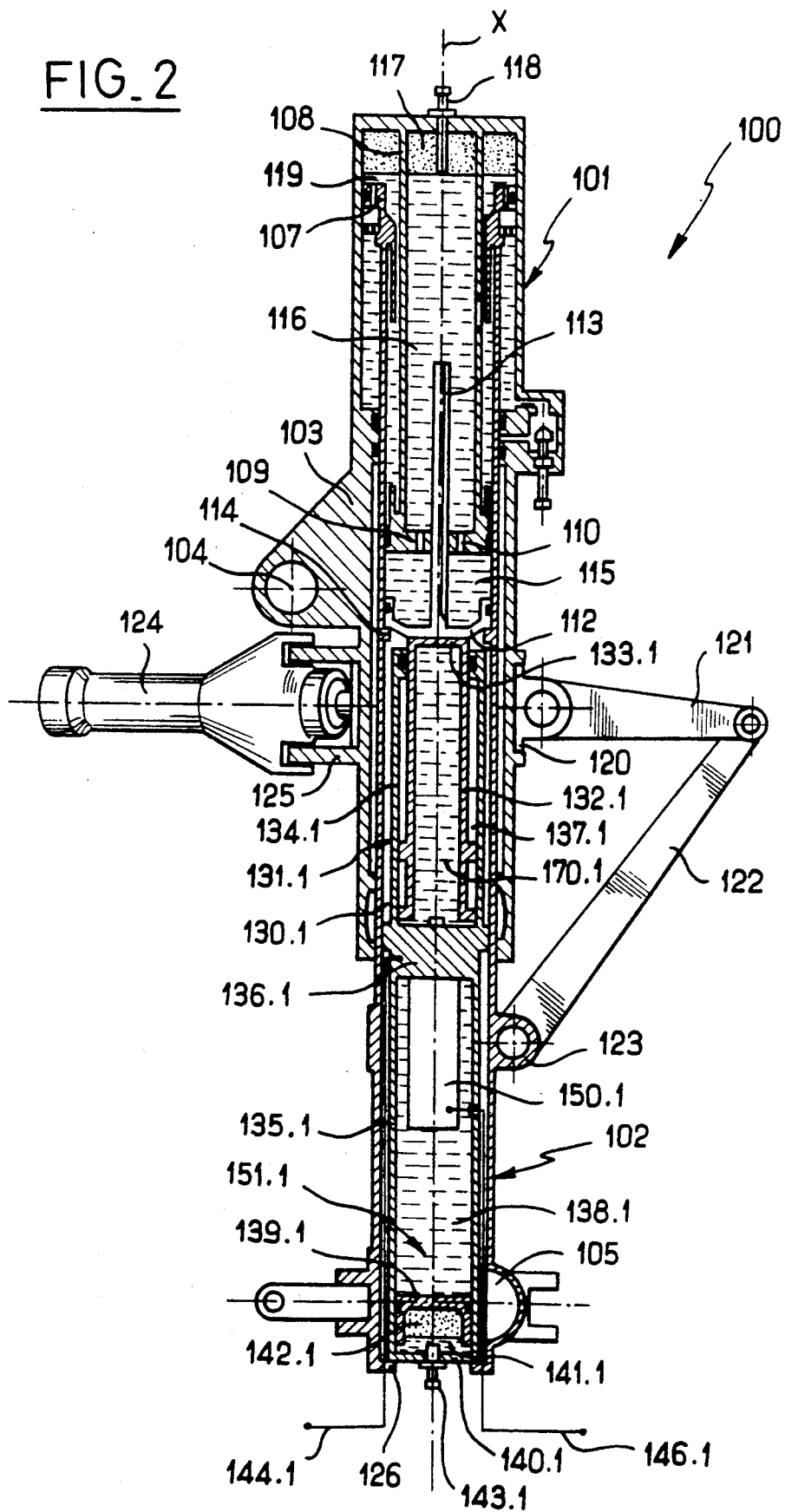
FIGS. 2 and 3 show the same shock absorber as it occurs under a static load (aircraft stationary on the ground), respectively when not extended and when extended.
Figure 3:
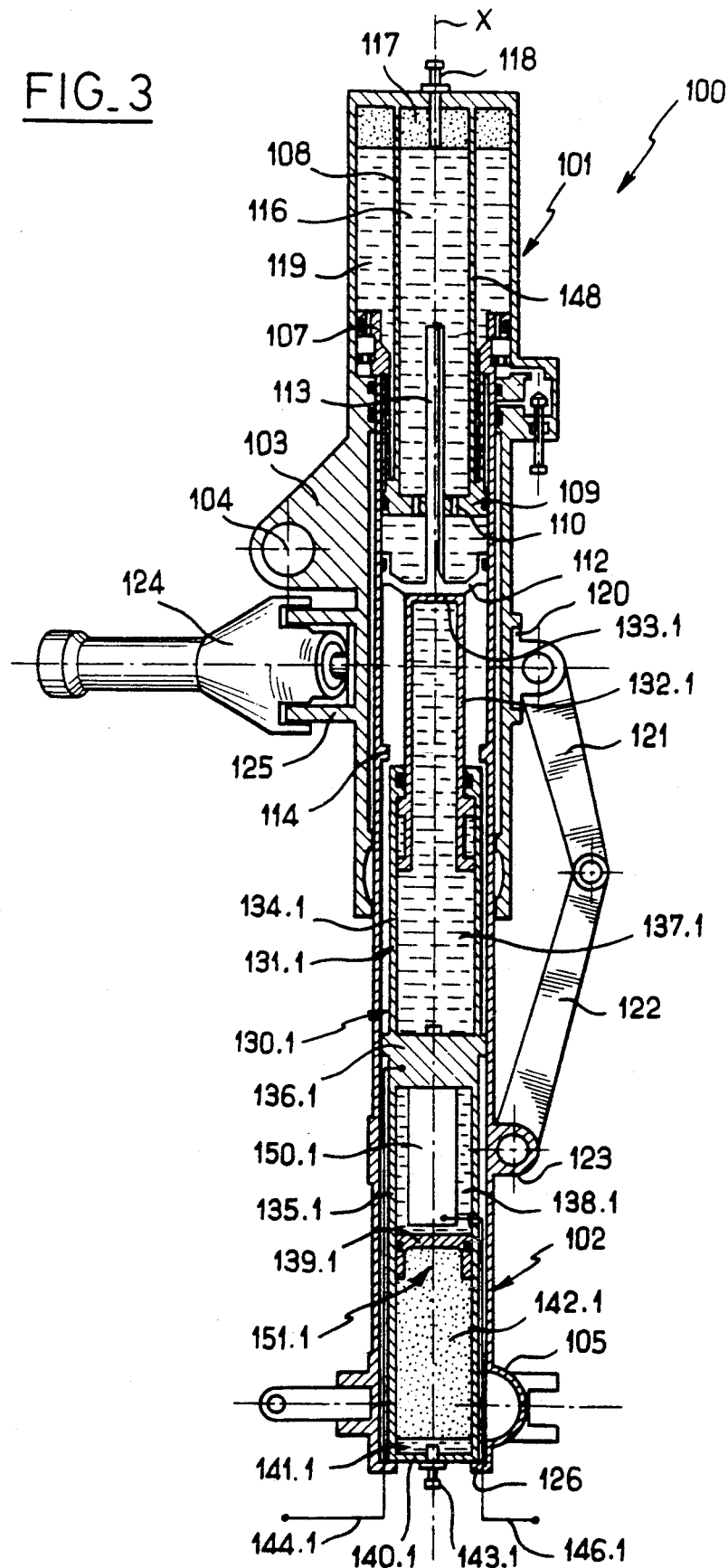

As can be seen in FIG. 2, when the shock absorber is under static load, i.e. when the airplane is stationary on the ground, the sliding rod 102 has been subjected to a retraction stroke into the cylinder 101 and the piston rod 132.1 which is driven with the sliding rod 102, is still retracted and is in contact with the moving disk 112. If it is now desired to extend the landing gear, it suffices to excite the above-mentioned electrically controlled valve 152.1 and to activate the electrical pump 150.1 so as to cause the piston rod 132.1 to be extended from the linear actuator, said piston rod then exerting thrust on the moving disk 112, which thrust causes the sliding rod 102 to extend from the shock absorber, i.e. raising the cylinder of said shock absorber since the sliding rod engages the ground via the running gear, and thus extending the landing gear. FIG. 3 thus shows the shock absorber 100 under static load, and when maximally extended (i.e. the piston rod 132.1 is extended maximally from the main body 131.1).

It is thus easy to change the attitude of the airplane, merely by acting on the control of the electrically controlled valve and by activating the electrical pump associated with the linear actuator. When there is no longer any need for such extension, it suffices to de-excite the valve, so that it returns to its rest position in which it allows return to take place automatically under drive from the static load exerted on the shock absorber without there being any need to provide a special control for this purpose. After coming back down, the shock absorber returns to the initial position it occupied under static load, i.e. as shown in FIG. 2.

As can be seen in FIGS. 1 to 31 the main body 131.1 of the linear actuator 130.1 receives the control means 150.1 of the linear actuator 130.1 in its bottom portion, whereby said means are integrated inside the sliding rod 102 in this case. Such a disposition is particularly advantageous when it is of great importance for the shock absorber to be compact. Nevertheless, it is possible to dispose the electrical pump 150.1 outside the main body of the actuator, i.e. outside the sliding rod 102 (which disposition is not described herein). Under such circumstances, advantages are obtained from the maintenance point of view since such external mounting facilitates taking action, should that be necessary, on the control means. When the electrical pump is integrated in the sliding rod 102, it is necessary, prior to taking action on said electrical pump, to disengage the cartridge constituted by the actuator, and this requires the airplane to be moved over an inspection pit or for its nose to be raised. By installing the electrical pump outside the sliding rod 102, a certain amount of compactness is forgone, but ground maintenance operations are greatly simplified.

As will easily be understood, the use of a self-contained linear actuator having independent control means makes it possible to separate functions completely so that the hydraulic fluids of the shock absorber and of the extending actuator are completely separate, and this avoids the need to provide special gaskets for this purpose. In addition, by having an actuator that is self-contained, it is possible to optimize it. It is thus possible to obtain an extension of about 300 mm easily using a shock absorber of the above-described type.

Figure 5:
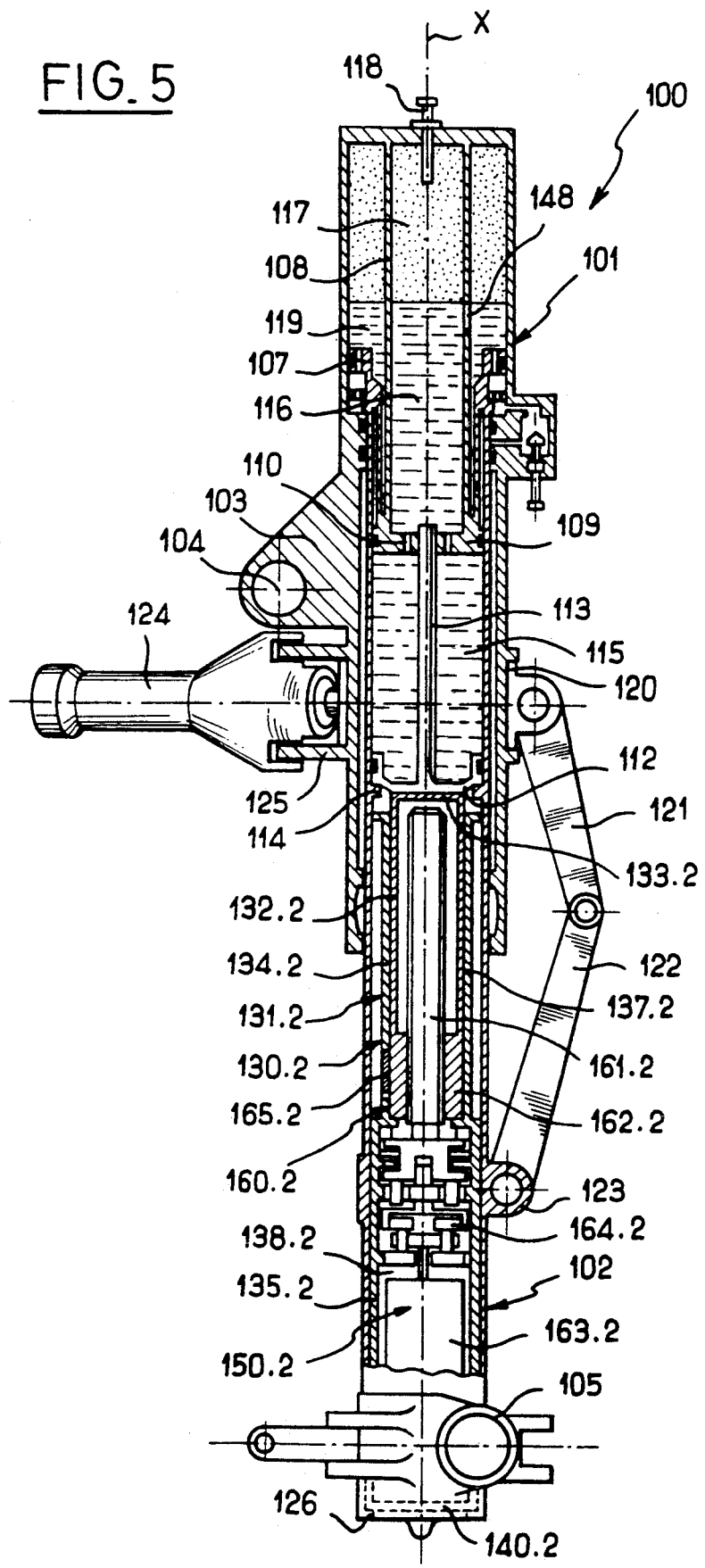
FIG. 5 is an axial section through another variant of the shock absorber of the invention in which the linear actuator is an electromechanical actuator based on a screw-and-nut system, with the associated driving motor and gear box assembly being integrated in this case inside the main body of said actuator.

Naturally, other types of linear actuator could be provided to perform the extension function, providing the actuator used is self-contained, and is interposed between the moving disk 112 and the bottom abutment 126 secured to the sliding rod 102. FIG. 5 thus shows another shock absorber of the invention in which the linear actuator is no longer electro-hydraulic, being based on a hydraulic actuator, but is electromechanical, being placed on a screw and nut system.

Overall, the component members of the shock absorber 100 shown in FIG. 5 are the same apart from the linear actuator that is used. These members are therefore given the same references as are used in describing the shock absorber of FIGS. 1 to 3.

The linear actuator 130.2 is thus an electromechanical actuator based on a screw-and-nut system 160.2 in which the screw 161.2 is prevented from moving axially and in which the nut 162.2 is secured to a hollow rod 132.2 which is in direct contact with the moving disk 112. Here again, the electromechanical actuator 130.2 comprises a main body 131.2 whose top portion 134.2 receives the hollow rod 132.2 that constitutes the axially-sliding moving member of the linear actuator. The nut 162.2 of the screw-and-nut system is prevented from rotating and is guided axially by members 165.2 disposed in conventional manner in the upper portion 134.2 of the main body 131.2. The end 133.2 of the hollow rod 133.2 is in contact with the moving disk 112, as is the end of the piston rod in the above-described linear actuator implemented in the form of a hydraulic actuator.

The screw 161.2 is preferably implemented in the form of a ball-screw or a roller-screw, like other electromechanical actuators used in aviation for other control functions. The hollow rod 132.2 thus slides inside a top chamber 137.2 of the main body 131.2 of the electromechanical actuator 130.2, said main body further having a bottom chamber 138.2 which forms a chamber inside the bottom portion 135.2 of said body in which a driving motor and gear box assembly 150.2 is received, and in this case is entirely received. The motor and gear box assembly thus comprises an electric motor 163.2 and a gear box 164.2 which is constituted in this case by two epicyclic stages, with the ball-screw 161.2 of the screw-and-nut system being mounted at the outlet therefrom.

The independent control means 150.2 are here again integrated in the main body 131.2 of the linear actuator 130.2. Nevertheless, it is also be possible to dispose the electric motor 163.2 and possibly also the associated gear box 164.2 outside the sliding rod 102 so as to facilitate taking action thereon during ground maintenance, as in the above-described variant.

When the airplane is stationary on the ground, the shock absorber under static load is in position corresponding to that shown in FIG. 2 for the preceding linear actuator. The end of the hollow rod 132.2 is nevertheless still in contact with the moving disk 112 such that actuating the electric motor 163.2 of the linear actuator causes the hollow rod 132.2 to be extended, thereby extending the landing gear as desired. To shorten the landing gear, it suffices to reverse the control to the electric motor, thereby returning the shock absorber to the initial position it had been occupying under static load prior to being extended. The extended position is preferably maintained by a brake (not shown) which is activated by switching off feed to the motor and which is installed at the outlet from the motor. If the screw-and-nut system is nonreversible, then the extended position may be maintained by said non-reversible feature.

A shock absorber is thus provided whose structure makes it easy to extend the landing gear when the airplane is stationary on the ground, without requiring use of the aircraft's own hydraulic generator system. The shock absorber is also simple in design and the extension it provides is easily controlled without any risk of causing a disturbance in or leakage from the hydraulic circuits of the airplane.

The invention is not limited to the embodiments described above, but on the contrary it extends to any variant that reproduces the above-described essential characteristics by equivalent means.

I claim:

1. A shock absorber for aircraft landing gear, the shock absorber comprising a cylinder and a rod sliding inside said cylinder, together with a moving disk delimiting a bottom hydraulic fluid chamber which communicates via a diaphragm with a top hydraulic fluid chamber adjacent to a pressurized gas chamber formed in the top of the cylinder, wherein a self-contained linear actuator is disposed coaxially inside the sliding rod, being interposed between the moving disk and a bottom abutment secured to said sliding rod, independent control means also being provided to control said linear actuator, which when engaged serves to extend the landing gear while the aircraft is stationary on the ground.

2. A shock absorber according to claim 1, wherein the linear actuator comprises a main body bearing against the bottom abutment, and a moving member whose end is in direct contact with the moving disk.

3. A shock absorber according to claim 2, wherein the bottom portion of the main body receives the control means of the linear actuator, such that said control means are integrated inside the sliding rod.

4. A shock absorber according to claim 2, wherein the control means are disposed, at least in part, outside the sliding rod so as to make it easier for ground crew to take action on said means, should that be necessary.

5. A shock absorber according to claim 1, wherein the linear actuator is a hydraulic actuator whose rod makes contact directly with the moving disk.

6. A shock absorber according to claim 5, wherein the hydraulic actuator includes a piston rod that is slidable in an upper chamber of the main body of the actuator, said main body further having a lower chamber in which a pressurized supply of hydraulic fluid and an electrical pump are provided, the outlet of the pump communicating with the inside of the piston rod.

7. A shock absorber according to claim 6, wherein the main body of the hydraulic actuator includes a central block delimiting the two chambers of said body, said central block receiving electro-hydraulic members associated with controlling the electrical pump.

8. A shock absorber according to claim 7, wherein the electrohydraulic control members include an electrically controlled valve which is excited to extend the landing gear, and de-excited to shorten said landing gear.

9. A shock absorber according to claim 1, wherein the linear actuator is an electromechanical screw-and-nut system whose screw is prevented from moving axially and whose nut is secured to a hollow rod which makes contact directly with the moving disk.

10. A shock absorber according to claim 9, wherein the hollow rod slides in an upper chamber of the main body of the electromechanical actuator, said main body further having a lower chamber in which at least a portion of a driving motor and gear box assembly is received.

* * * * *